July 12, 1966 R. A. HEMPEL 3,260,995

CHARACTER READING SYSTEM EMPLOYING SEQUENTIAL SENSING OF MATRIX INPUT

Filed Jan. 16, 1963 5 Sheets-Sheet 1

INVENTOR.
ROY A. HEMPEL

BY

Sughrue, Rothwell, Mion and Zinn
ATTORNEYS

July 12, 1966 R. A. HEMPEL 3,260,995

CHARACTER READING SYSTEM EMPLOYING SEQUENTIAL SENSING OF MATRIX INPUT

Filed Jan. 16, 1963 5 Sheets-Sheet 2

INVENTOR.
ROY A. HEMPEL

BY

Sughrue, Rothwell, Mion and Zinn
ATTORNEYS

INVENTOR.
ROY A. HEMPEL
BY
Sughrue, Rothwell, Mion & Zinn
ATTORNEYS

INVENTOR.
ROY A. HEMPEL

BY

Hughes, Rothwell, Mion and Zinn
ATTORNEYS

INVENTOR.
ROY A. HEMPEL
BY
Seghue, Rothwell, Mion and Zinn
ATTORNEYS

United States Patent Office 3,260,995
Patented July 12, 1966

3,260,995
CHARACTER READING SYSTEM EMPLOYING SEQUENTIAL SENSING OF MATRIX INPUT

Roy A. Hempel, Phoenix, Ariz., assignor, by mesne assignments, to Textron Electronics, Inc., Providence, R.I., a corporation of Delaware Filed Jan. 16, 1963, Ser. No. 251,966
14 Claims. (Cl. 340—146.3)

This invention relates to a system for deriving signals significant of a character and more particularly to a system in which a character is illuminated by light and its image is projected onto a matrix of photosensitive devices whereby scanning of these devices will provide said significant signals.

Character recognition systems are of prime importance today in many fields. One particular field of interest is called the bank check field. Here a large number of checks are accumulated by a bank and they must be scanned for significant information thereon. Automated systems are now available whereby this scanning is done electronically and the information is posted from this electronic scan. To a significant extent, the scanning systems presently in use are deficient at least for one reason. Misregistration or misalignment of characters often provide scanning signals which are not truly significant of the scanned character. In accordance with the present system, however, this problem of misregistration or misalignment is largely minimized by deriving signals significant of the character scanned, which signals functionally relate adjacent segments of the character to each other. In accordance with the instant system, significant signals are derived which are less sensitive to the position of the character, width of the character, height of the character, etc. The parameters of importance in accordance with the present system are so-called line intercepts achieved along various horizontal segments of the character while the character is being scanned. An additional parameter of interest is the horizontal length along these segments occupied by the character.

It should be mentioned that whereas horizontal scanning is hereinafter illustrated, vertical scanning or even slant scanning, that is, such as 45° scanning, can be employed.

Another particular advantage of the present invention over present systems may be explained as follows:

Let it be assumed that the character H is being scanned. Present systems may scan horizontal segments of the character and note for each segment how far the first intercept (left-hand vertical stroke of H) is from the second intercept (right-hand vertical stroke of H). Problems occur in such systems if the system is primarily adapted to handle one size or style of lettering or if the characters are not all uniformly printed, such as for instance if the two vertical strokes of the H are not precisely parallel. The present invention, however, largely minimizes these problems by emphasizing the relationship between adjacent intercepts in each horizontal scan. While the present invention does use the relationships between the first, second, etc., intercepts, it concentrates on adjacent horizontal intercepts of the same stroke of the character being scanned. In this way, the present invention collects data as to whether or not the stroke or line is vertical, horizontal, sloping, etc.

The ability of the present invention to analyze characters in this manner adapts it for a variety of uses.

Among these are the orientation of objects on a conveyor or support so that a pickup device can be similarly oriented to remove said objects therefrom; the scanning and duplicating of schematic, identification of objects and distinguishing between them (such as resistors, capacitors, diodes, etc.); scanning and reading of maps, roads, terrain and topographic features, facial features, etc. It is an object of this invention to provide such a system.

It is therefore one object of the present invention to provide a system for deriving signals significant of a character by optical scanning.

It is an object to provide a system which is more independent of character height, line width, character width and print style.

It is a further object of this invention to provide such a system which is accurate, time efficient, and easy to construct and maintain.

Broadly speaking, the present invention provides a system for deriving significant signals of a character that comprises projecting an image of the character onto a plurality of photosensitive devices such as photocells which are arranged in columns and rows to form a matrix of devices. These devices are effectively two-state devices having a low impedance when not intercepting the projected dark image of the character being scanned and having a relatively high impedance when intercepting this dark image. Means are provided in accordance with this invention to sequentially determine the impedance states of individual devices in successive columns of said devices, to store an indication of the first of said devices in each of said rows which exhibits a state indicative of an interception of the projected character image and means to compare the relative position of said first devices in adjacent rows. From these relative positions the significant signals are derived.

Further significant signals characteristic of the character scanned are derived by noting further intercepts in horizontal segments of the character and also in noting the length of various horizontal segments of the character.

The above objects and others will become apparent from a more detailed description of the accompanying drawings.

Figure 1:
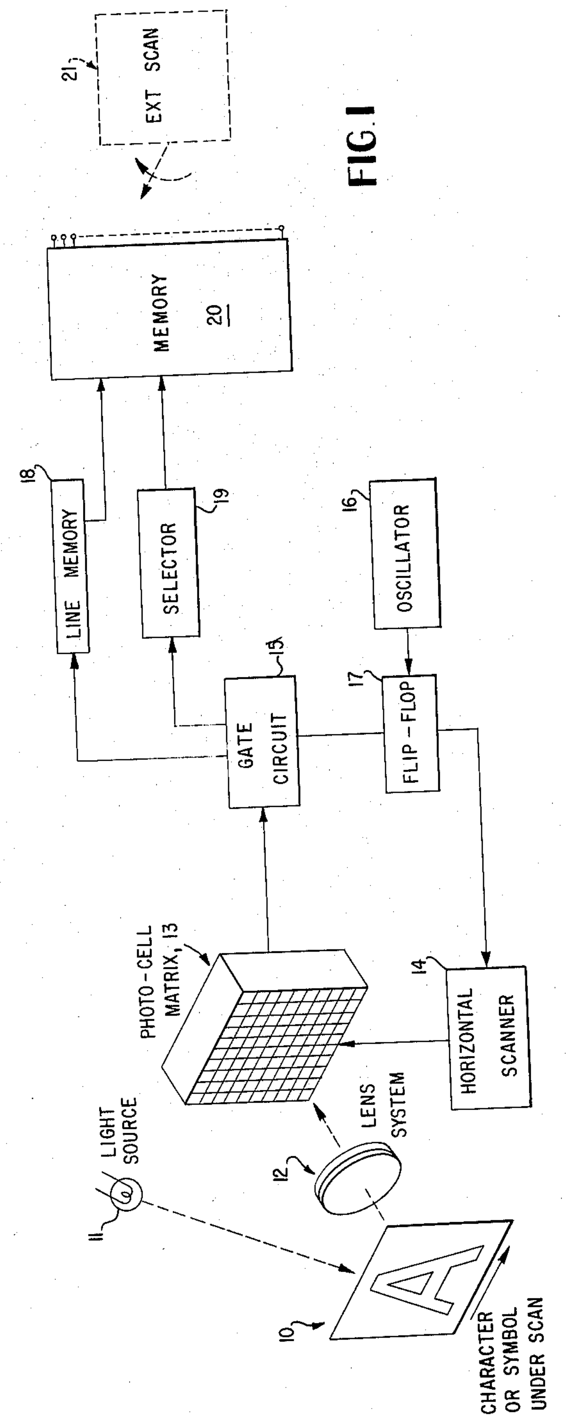
FIGURE 1 is a schematic representation, partly in perspective, showing the general details of the over-all system constructed in accordance with the present invention.

Referring first of all to FIGURE 1, numeral 10 identifies the medium upon which the characters are printed.

This may be for instance, a card or paper or the like. A light source 11 illuminates the character, shown here as in A, and the reflected image of the character through a lens system 12 is projected upon a photocell matrix 13. The horizontal scanner 14 sequentially scans the columns of photocells in the matrix to provide sequential outputs to the gate circuit 15. The oscillator 16 drives the flip-flop 17. The flip-flop performs three functions. First, it provides the advance pulses for the scanner 14 to sequentially scan the vertical columns of the matrix 13. Second, it provides pulses to the gate circuit 15. A third function of the flip-flop 17 will be explained in connection with later figures. The gate circuit 15 provides outputs for the line memory 18 and the selector 19. The functioning and operation of the line memory and the selector in connection with the gate circuit as well as the co-operation between the line memory, the selector and the memory 20 will be more specifically explained in connection with other figures. The memory 20 effectively stores the information resulting from the scan of the image of the character projected on the matrix 13. The stored information in memory 20 is then examined by an external scan identified by numeral 21 and explained later in connection with another figure.

Figure 2:
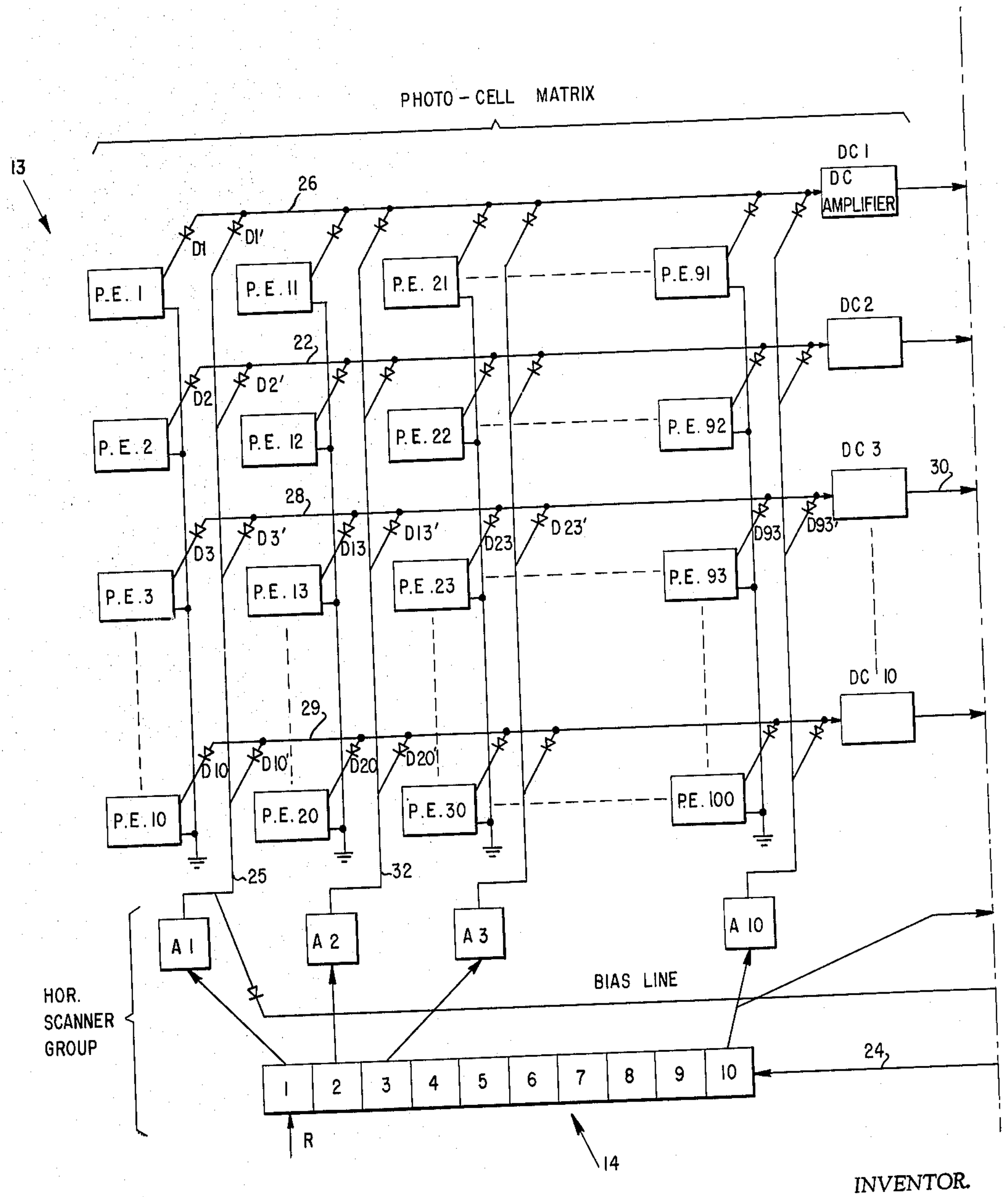
FIGURES 2 and 3 are figures showing hardware implementation of the various portions of FIGURE 1.
Figure 3:
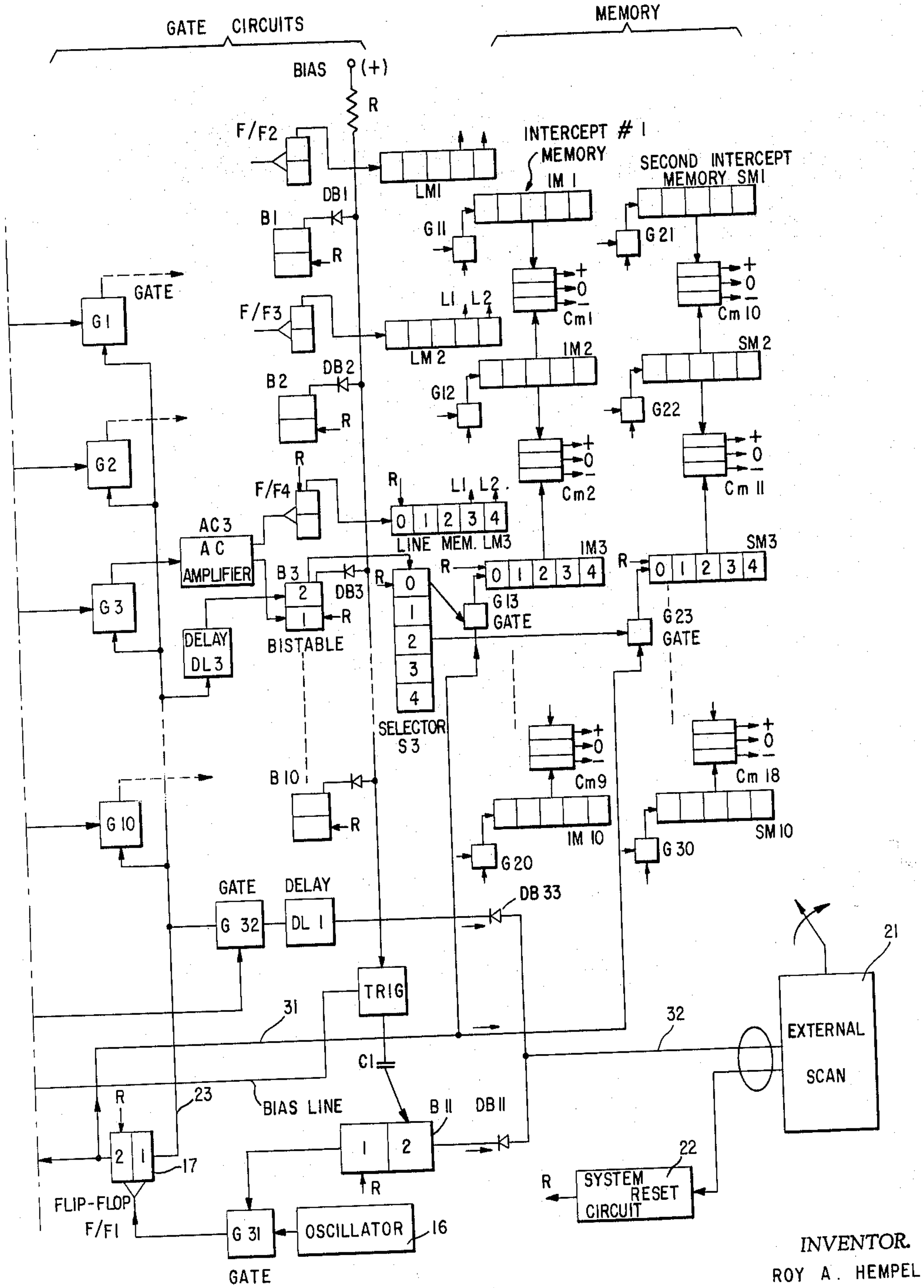

Now referring to FIGURES 2 and 3, the external scan 21 initiates the operation of the system reset circuit 22 to provide at various places indicated, the reset pulse R. The resetting of bistable unit $B_{11}$ closes gate G31 to pass pulses from oscillator 16 to flip-flop 17 indicated as F/F1. The oscillator 16 is a pulse oscillator operating at some suitable frequency such as 10 kc. The first pulse from the oscillator 16 will switch F/F1 to provide an advance pulse on line 24 to the horizontal scanner 14. This scanner is effectively a decade counter containing a binary-quinary circuit (or equivalent) having ten stable states. One example is shown in U.S. Patent No. 3,038,658 to Roy A. Hampel, Electronic Counter. With a count of 1 in the scanner 14, the ouput of amplifier A1 will provide an uplevel to line 25 of the matrix 13. It will be noted that each of the photocell circuits indicated as P.E. 3, etc., are associated with two diodes such as D3 and D3'. Each pair of diodes operates as an AND gate. For the purposes of describing the functioning of the matrix, let it be assumed that when the reflected image of the character intercepts the cell, it is black, and when the image does not, it is white. Additionally, when the cell is black, it provides an uplevel output to its associated diode such as D3. It can be seen then that with an uplevel on line 25 and an uplevel output from, for instance P.E. 3, that the AND gate constituted by D3 and D3' will have both of these diodes reverse biased so that the line 28 associated with D3 and D3' will be at an uplevel. With line 28 at an uplevel, the D.C. amplifier DC3 inverts the input thereto and provides a downlevel output from D.C. amplifier DC3 thereby conditioning its related gate G3 so that the negative pulse output from F/F1 will pass therethrough.

If, on the other hand, P.E. 3 were white, then the line 28 would be at a downlevel to provide an uplevel at the output of the D.C. amplifier DC3 to block or close gate G3 to prevent the negative pulse from F/F1 passing therethrough.

Let us assume that the first column of cells P.E. 1 through P.E. 10 are all white. In this case, all of the gates G1 through G10 are blocked. All selectors and intercept memories have a count of zero. It should be noted at this time that what we may call the left-hand output from F/F1 not only passes along line 24 to the horizontal scanner 14 but also on line 31 to gate G13 and gate G23 as well as all similar gates associated with the intercept memories. G13 is connected to the 0 stage of selector S3, indicating a count of 0 therein, so that G13 is open or unblocked. However, gate G23 is connected to stage 2 of selector S3 and is therefore closed or blocked. Consequently, the first pulse from F/F1 will pass through gate G13 and all similar gates to step all intercept No. 1 memories such as IM3, to a count of 1. The functioning of the intercept No. 1 memory is to provide an indication of the position of the first intercept, that is, the first horizontal scanning position at which a cell is black. The second pulse from the oscillator 16 switches F/F1 to provide a negative pulse on line 23 which cannot get through any of the gates G1 through G10. However, this negative pulse passes through delays associated with each of the horizontal rows of cells in the matrix such as delay DL3. This delay may be any conventional type and includes an amount of delay equal to that of the associated A.C. amplifier AC3.

The negative pulse output of the delays such as DL3, due to the second pulse of oscillator 16, are connected to the respective bistable devices B1 through B10. The connection is made to side 2 thereof to effectively place the bistable device in its reset state. Under the conditions about which we are talking now, that is, interrogation of the column 1 cells in which all are white, none of the bistable devices B1 through B10 will provide any outputs to their associated selectors. Of course, since the gates G1 through G10 are blocked or closed, there will be no outputs from the associated A.C. amplifiers. However, all of the intercept No. 1 memory units IM1 through IM10 will have a count of 1 stored therein as a result of the first pulse of oscillator 16. The second intercept memory devices SM1 through SM10, because their associated input gates G21 through G30, etc. are blocked, will have a zero count stored therein. It should be stated at this time that the intercept memory devices, both first and second, may be conventional decade counters or a quinary circuit such as shown and described in Patent No. 3,038,658. In the latter case, the quinary circuit provides an output therefrom which is in the form of a staircase voltage the plateau of said voltage being a function of the number of pulses fed to the circuit.

Let us assume hereinafter that the first intercept memory devices are conventional ring decade counters, that is, counters which step from one stage to the next in response to the input thereto of a single pulse. While a ring counter of only five stages is shown, it should be considered that each has nine stages, that is, one less than the number of columns in the matrix. This insures that if there are no intercepts in a particular row, the IM returns to a count of zero on the tenth pulse.

Thus far we have seen the results of the first and second pulses from oscillator 16 providing interrogation of the first vertical column of cells in the matrix 10 and resultant storage in IM1, etc. The third pulse from oscillator 16 will switch F/F1 to provide another advance pulse on line 24 to the horizontal scanner 14. Stage 2 now will provide from the amplifier A2 an uplevel on line 32. This will reverse bias all of the primed diodes associated with this line. Let us assume here that in the second column of cells, all cells are white except P.E. 13. Let us assume that this cell is black because a portion of the reflected image of the character intercepts this cell. This means that line 28 is at an uplevel. The output of D.C. amplifier DC3 on line 30 will be at a downlevel to condition gate G3. The fourth pulse from oscillator 16 will switch F/F1 to provide a negative pulse on line 23. This pulse will pass through only gate G3. The output of gate G3 feeds the A.C. amplifier AC3. The negative pulse will also pass through delay DL3 and will reach B3 at the same time as the output pulse from AC3. Note the fact that the output from AC3 feeds stage 1 of B3 and the output from DL3 feeds stage 2 of B3. The outputs of these two units are so arranged that they arrive at B3 at the same time but the output of AC3 overrides the output of DL3. This, then, will set bistable device B3 and provide an output to selector S3 to move it from a count of 0 to a count of 1. Gate G13 is then blocked. Stored in IM3 is a count of 1. However, since G13 is now blocked, IM3 will store an indication of the fact that the first intercept in the third horizontal row of cells in the matrix 10 occurred in the second column cell thereof, namely, P.E. 13. The other gates G11, G12, G14, etc., are still unblocked or open. When the fifth pulse from oscillator 16 provides an advance pulse on line 24 and also a pulse on line 31, all intercept No. 1 memories IM1, IM2, etc., except for IM3, will receive this fifth pulse. In those intercept No. 1 memory devices, a count of 2 will be stored.

Now the system continues to scan each one of the vertical columns of cells in the matrix 13. At various times depending upon when the first cell in a particular row is reached which is black, the intercept No. 1 memory devices will reach a count indicative of the column in which this black cell finds itself. If, for instance, P.E. 21 and P.E. 22 are the first black cells in the first and second horizontal rows to the matrix, then IM1 and IM2 will store the same count. This would mean of course that the reflected image had a substantially straight line portion intercepting P.E. 21 and P.E. 22.

Thus far, we have seen with particular reference to the third horizontal row of cells that when the first intercept is made in this row, selector S3 moves from its 0 stage to its 1 stage to thereby block or close gate G13. If upon further scanning a second intercept is made along the third horizontal row of cells, selector S3 is moved from its 1 stage to its 2 stage. This then, would unblock or open gate G23. SM3 would then contain a count of one. By similar operation, the second intercept memory devices will store therein indications of the second intercepts along any particular horizontal row of cells in the matrix. These second intercept memories need not be ring counters. They may be conventional non-ring decade counters since they do not begin to count until a first intercept has been made and a second intercept subsequently occurs. They stop their count when a third intercept is made. It can be seen that by proper modification of selectors, gates, and intercept memory devices additional intercepts can be noted.

The second output from the A.C. amplifiers, such as for instance AC3, feeds an associated flip-flop such as F/F4. The output from the A.C. amplifier feeds both sides of the flip-flop. This flip-flop functions effectively as a divider by a factor of 2. The output of these flip-flops feed line memories identified as LM1 through LM10. Every two pulses into these flip-flops give one pulse out to the line memory. Thus, for instance, an extra wide line might merit two pulses from say AC3 and would only move the line memory LM3 to position 1. It would take a horizontal line or a near horizontal line to move LM3 up to a count of 4 or 5. This might be the case, for example, in the letter T. Of course, in this case it would probably be LM1 that would store all of the pulses for the horizontal bar on top of the T.

Turning for a moment to bistable device B11, it will be noted that the output of trigger TRIG is connected through condenser C1 to the second stage of B11. Initially B11 is reset by reset pulse R to thereby keep gate G31 unblocked or open so that the pulses from oscillator 16 pass to F/F1. However, at any time after the initiation of the scan should a complete vertical row of cells be white, then all of the bistable devices B1 through B10 will be in the reset stage and the diodes DB1, DB2, etc., will all be back biased. The bias (+) voltage through resistor R will then be provided directly to trigger TRIG to switch said trigger and cause B11 to flip to its reset state. This will then block or close gate G31. It will also provide an output pulse from B11 through diode DB11 along line 32 to the external scan 21. This will mean that all of the cells in the matrix intercepting the image have been scanned by the horizontal scanner and that the external scan 21 should then investigate what the results of this scan are.

External scan 21 may also be activated by a pulse on line 32 after the scanner 14 has scanned the entire matrix.

A pulse from scanner 14 to A10 is also sent to G32 which is conditioned by F/F1 to pass a pulse to delay DL1. The output of DL1 through diode DB33 is fed to the external scan 21 along line 32.

Note the fact that trigger TRIG is connected to a bias line from a diode connected to line 25 associated with amplifier A1. Such an arrangement will prevent this trigger from flipping B11 before the scan has reached the first portion of the reflected image being scanned. Additional diodes can be connected to the bias line from the outputs of other amplifiers, for instance A2 and A3. The over-all purpose here, of course, is to make sure that this trigger distinguishes between all white photocells due to the completion of the scan of the character and all white photocells due to the failure of the scan to reach in the first instance the reflected image.

It will be noted that between adjacent intercept memory devices such as IM1 and IM2 is a comparator such as CM1. The comparators compare the count in adjacent intercept memories such as IM1 and IM2. If for instance the count in IM1 is greater than that in IM2, the + output line is raised, if less than IM2 then the − output line is raised and if equal to IM2, the zero output line is raised. A + output indicates that IM2 intercepted before IM1, a zero output indicates that IM2 and IM1 intercepted at the same time, and a — output indicates that IM1 intercepted before IM2. If IM1 intercepts during the scanning of the third vertical row of cells and IM2 intercepts during the scanning of the second vertical row of cells, then of course the + output line is raised.

Now the external scanner sequentially looks at the outputs of all of the line memories LM1 through LM10 and all of the comparators CM1 through CM18. It gathers all of this information which is characteristic of the reflected image of the character on the matrix and decides what character is being scanned. The system is designed on an individual cell basis to note the relative distance from starting point to the first line intercept. The system ignores the thickness of the line, unless usually thick, and ignores the distance between the first line intercept and the second line intercept but notes the distance from the second line intercept to either the third intercept or to the end of the character. The system also notes when the end of the character has been reached, as indicated by all vertical spaces being white. First, if a horizontal or near horizontal line is scanned, the system is designed to distinguish it from a dot. The line memories such as LM1, etc., serves the purpose of distinguishing a horizontal or near horizontal line from a dot or a clutter of small dots on the medium being scanned. Second, the comparator, between the intercept memory devices, by noting the relative intercept positions therebetween can give an indication of the slope of the line of the image between adjacent rows of cells. This provides a system somewhat independent of absolute intercept distance from a starting point or distance between intercepts, and tolerates differently sloped characters.

While a matrix of photocells is specifically illustrated, cathode ray tube scanning can also be employed with attendant modifications to provide the same type of signals for use by the external scan.

Figure 5:
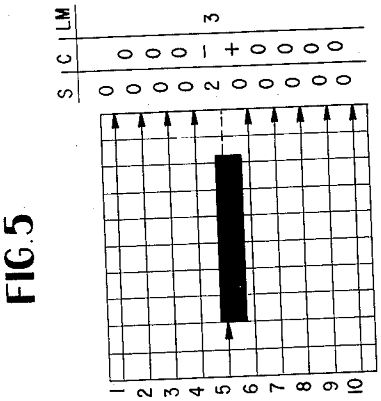
Figure 4:
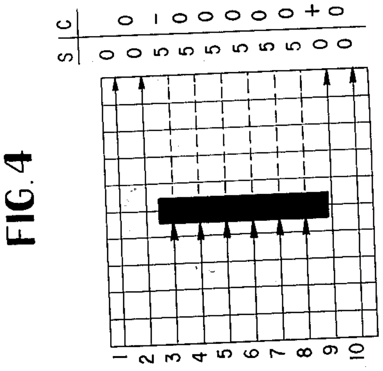

Referring to FIGURE 4, there is shown what may be identified as the numeral 1. IM1 will store a zero plateau, IM2 a zero, IM3 to IM8 a five and IM9 and IM10 will store a zero. Now the comparators will indicate the following: CM1 will indicate a zero, CM2 will indicate a —, CM8 a +, and CM9 a zero. All the remaining comparators, of course, store a zero. Comparing this to a horizontal line as shown in FIGURE 5, all of the comparators will store a zero with the exception of CM4 which stores a — and CM5 which stores a +. Line memory LM5 will store a 3. This is because it will have received six pulses.

Figure 6:
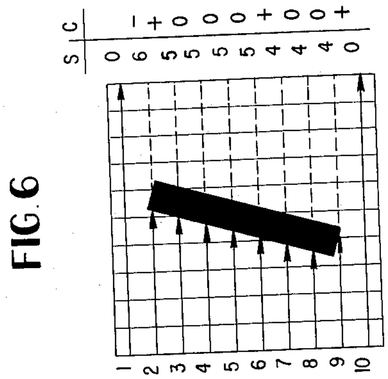
FIGURES 4 to 9 are diagrammatic representations showing the results of the scanning operation and production of significant signals relative to various configurations of characters.

Referring to FIGURE 6, there is given an example whereby the vertical line slants somewhat toward the right. The particular values in the selectors and comparators are shown. In all of these figures, the numbers 1 to 10 at the left-hand vertical portion of the diagram indicate the horizontal rows of cells. The vertical lines indicate the vertical columns of said cells.

Figure 7:
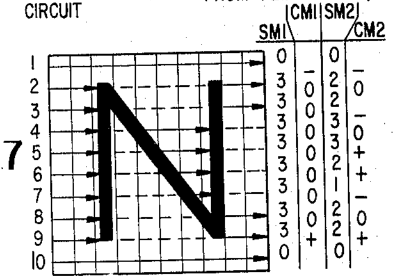
Figure 8:
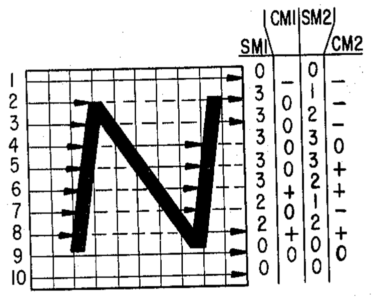
Figure 9:
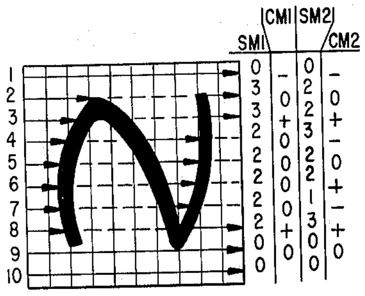

FIGURES 7 to 9, inclusive, illustrate three forms of the character N. IM1 stands for the first intercept memories such as IM1, IM2, etc.; CM1 for the first intercept comparators such as CM1, CM2, etc.; SM2 for the second intercept memories such as SM1, SM2, etc.; and CM2 for the second intercept comparators such as CM10, CM11, etc.

Let us now compare FIGURES 7 and 8. In each, IM1 will have a count of zero because the first or top horizontal row of cells in the matrix is all white. IM2 through IM6 store a count of 3, meaning that the first intercept occurred upon scanning the third row of cells in the matrix. In FIGURE 7, IM7 through IM9 store a count of 3 and IM10 a count of zero. In FIGURE 8, IM7 and IM8 store a count of 2 and IM9 and IM10 a count of zero. In FIGURE 7, CM1 compares a count of zero in IM1 to a count of 3 in IM2, to give a — output. CM2 compares a count of 3 from IM2 with a count of 3 from IM3 to give a zero output. This same logic is followed throughout all comparators to give the comparator outputs for FIGURES 7 and 8. Note the slight difference in CM1 outputs for the two types of N.

Now with regard to the second intercepts, in FIGURE 7, the first row of cells in the matrix never experiences either a first or a second intercept so that the second intercept memory associated therewith SM1 always stores a zero count. The second row of cells in the matrix does have a second intercept and counts two pulses thereafter till the end of the scan. So SM2 stores a count of 2. SM3 stores a count of 2 also. Since row 4 actually has three intercepts it stores a count of 3 being initiated by the second intercept and terminated by the third intercept. Similar logic prevails for the rest of the second intercept memories of FIGURE 7 and all those of FIGURE 8. Again, the comparators compare adjacent second intercept memories and provide the results shown under CM2. The values of CM1 and CM2 are scanned by the external scan and compared to stored values for all characters including at least then two types of the letter N. Similarly comparison could be made including the N type of FIGURE 9 which also has its equivalent comparator response stored in the memory of the external scan.

The flip-flop devices such as F/F1, etc., and the bistable devices such as B1, etc., may be conventional two-state devices or may be such as shown and described in the recently issued patent of Roy A. Hempel entitled "Electronic Counter," Patent No. 3,038,658. The horizontal scanner 14 may be the scanner shown and described in the above-mentioned patent. The selectors and first and second intercept memory devices may be decade counters or conventional stepwave voltage generators or as more particularly shown in the above-identified patent. The trigger TRIG is a conventional trigger. The gates are conventional AND gates, preferably employing semiconductor diodes.

Figure 10:
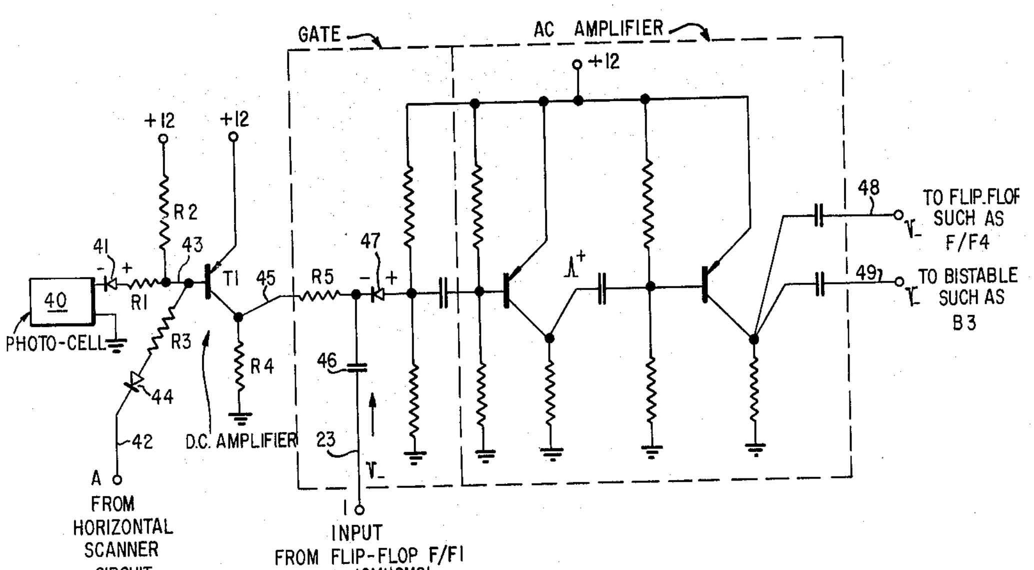
FIGURE 10 is a circuit diagram of one type of photocell circuit, gate, and A.C. amplifier that may be employed in accordance with the present invention.

In FIGURE 10 is shown the photocell and its associated circuitry functioning in connection with its associated gate D.C. and A.C. amplifiers. The photocell 40 may be a conventional photocell. One side of the photocell is connected to ground and the other side to the cathode of a diode 41. The 12-volt supply is connected through resistor R2 and R1 to the plate of diode 41. Line 42 which may correspond to any one of the lines 25, 32, etc., is connected through diode 44 and resistor R3 to junction point 43 which corresponds to the base of transistor T1. The emitter of T1 is connected to +12 volts and the collector through resistor R4 to ground. The collector also provides the output from T1, said T1 functioning as the D.C. amplifier such as DC1, etc.

Let us now assume that the photocell is white. In this case, it has a low impedance and regardless of the potential of line 42, T1 is conducting. In this case, the output of T1 is at an uplevel on line 45. The only time that the output on line 45 is going to be at a relatively low level is when the photocell is black, having a high impedance, and the potential of line 42 is at an uplevel, such as, for instance, when the scanner 14 provides an uplevel on line 25. At this time then, the potential at 43 will be at approximately 12 volts and T1 will be shut off. The output from T1 on line 45 then provides a downlevel. Line 45 is connected through R5 to diode 47. Line 23 from F/F1 is connected through condenser 46 to diode 47. It can be seen that with the output of the D.C. amplifier at a low level on line 45, then diode 47 will be unblocked and can pass a negative pulse therethrough supplied from F/F1 on line 23. The A.C. amplifier includes two transistors connected in cascade with associated resistors and condensers to provide negative pulses at the output on lines 48 and 49, one of which goes to the flip-flop such as F/F4 and the other to the bistable device such as B3. When the photocell is white, no outputs are obtained, but when it is black, these two outputs are obtained.

Figure 11:
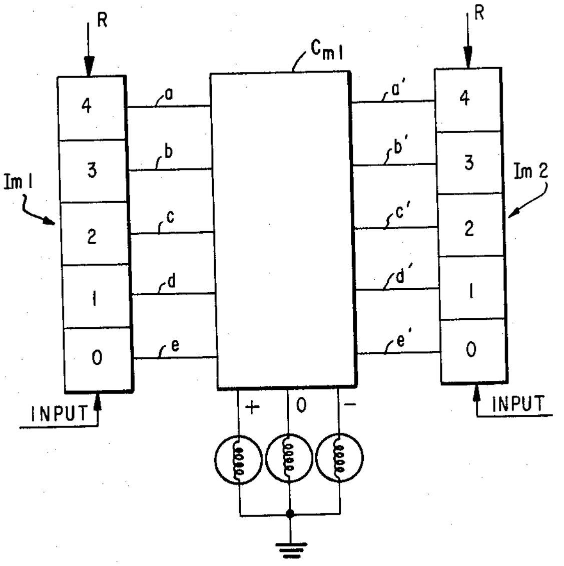
FIGURE 11 is a block diagram showing the relationship between two intercept memory devices and a comparator.
Figures 12, 13:
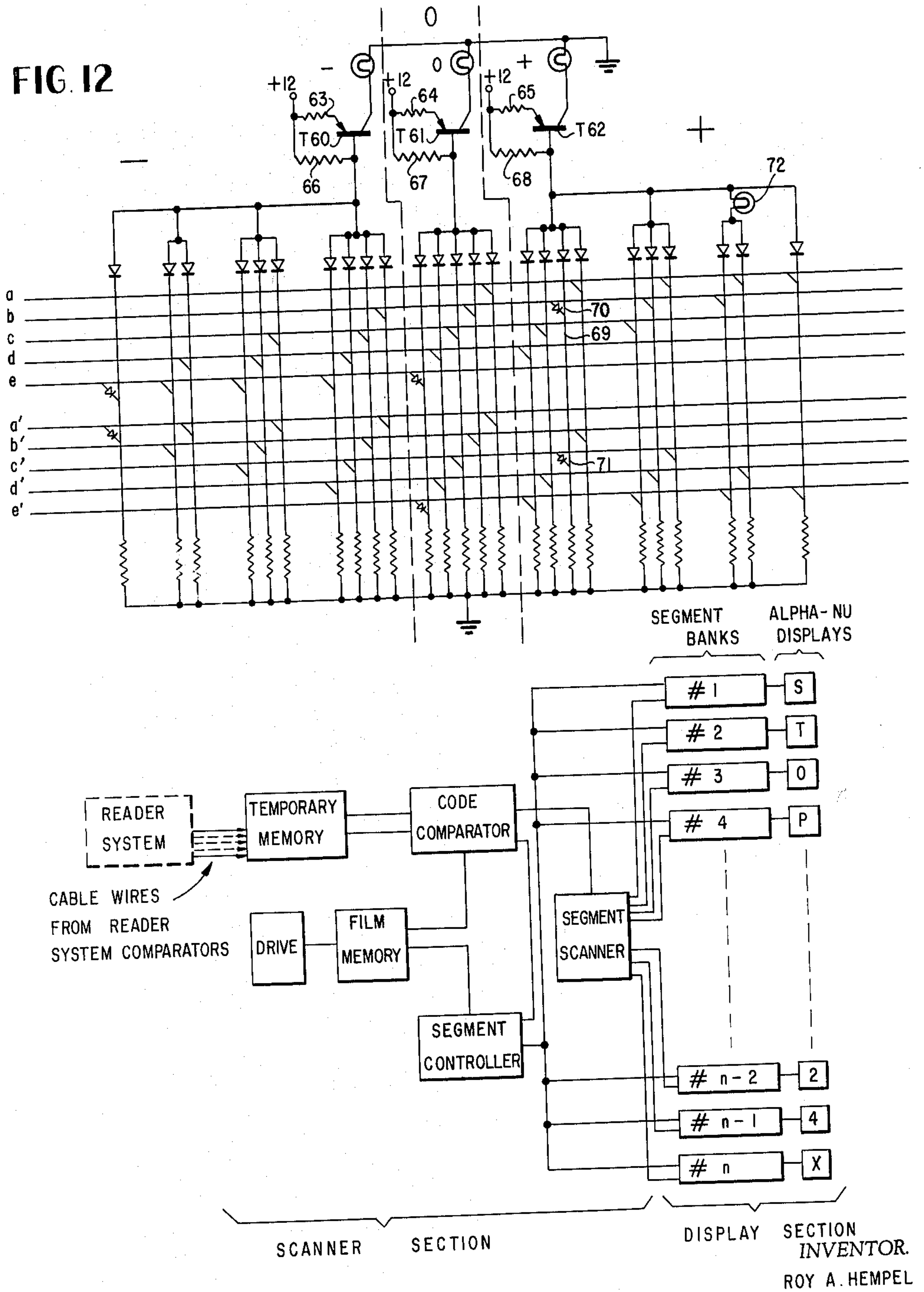
FIGURE 12 is a circuit diagram of one form of comparator circuit which may be used in connection with the present invention.
FIGURE 13 is a diagrammatic illustration of one form of external scan that may be employed in conjunction with the reader of this invention.

One type of comparator that may be used is shown in FIGURE 12. FIGURE 11 shows the relationship of comparator CM1 in block form to IM1 and IM2. If the count in both is equal, the zero output lamp is lighted. If the count in IM2 is greater than that in IM1, then the — lamp is lighted and if the reverse then the + lamp is lighted. These lamps may be changed to resistors and the voltage at the ungrounded side thereof may be used as the comparator output. The output lines from each IM are identified herein as *a*, *b*, *c*, *d* and *e* and *a'*, *b'*, *c'*, *d'* and *e'*. If, for instance, IM1 is a count of 3, then line *b* is lowered to some voltage as for instance +6 volts, and the remaining lines are at about +11.6 volts. If IM2 has a count of 2, then line *c'* is at about +6 volts and the remaining lines associated therewith are at about +11.6 volts. The comparator + lamp is on. How it is turned on is shown in FIGURE 12.

Referring to FIGURE 12, let us assume that lines *a* through *e'* at the left-hand side are at +11.6 volts. Then transistors T60, T61 and T62 are off. All lamps are off. Resistors 63, 64 and 65 are 82 ohm resistors and resistors 66, 67 and 68 are 47K ohm resistors. Now, with *b* and *c'* at +6 volts, only the vertical line 69 of the diode matrix has both of its associated diodes 70 and 71 forward biased at +6 volts. Line 69 is then at +6 volts and this voltage when applied to the base of transistor T62 turns it on. The lamp goes on. By similar logic, it can be seen that depending upon the count in the two IM's being compared, the zero, + or — lamp will be selectively on. For more detailed data for use by the external scan, individual amplifiers and lamps may be placed in positions such as lamp 72 in all the nine branches of the matrix so that data may be supplied not only that the comparison is a + but how much it is plus. In the case of lamp 72 being on, the data supplied would be 3. This means that the count of the two IM's differ by 3. One of the three matrix sections, zero, + or — may be eliminated. If, for instance, the — section is eliminated, means should be provided for turning on the + lamp if and only if the zero and lamps are off.

The circuits of FIGURES 11 and 12 permit the external scan to readily examine the contents of the adjacent intercept memories, minimizing the number of readout points the external scan must examine, and at the same time doing some of the interpretive work for the external scan.

Referring to FIGURE 13, the data from the reader system described hereinbefore is scanned and sent to the temporary memory. This data is, of course, supplied from the various comparators in the line memory sections. The data is temporarily stored in transistor bistable units or their equivalent and at the end of a suitable cycle erased so that the output of the reader may be again stored. The external scan shown here is a derivative of that shown and described in copending application of Roy A. Hempel, Serial No. 63,305, entitled "Alpha-Numerical Display System," filed October 18, 1960, now abandoned.

The drive functioning in connection with the film memory sends to the code comparator data significant of the characters and possible variations therein that might occur. The data as stored by temporary memory is sent to the code comparator where the comparison takes place. The data indicative of the character scanned in the reader system is compared to all of the data film memory and when the code comparator recognizes the character scanned by the reader system a recognition signal is provided. This recognition signal goes to the segment controller and tells the segment controller that the display data associated with that recognized character should now be sent to the segment banks. The segment scanner is either an electromechanical stepper switch or equivalent electronic switch unit for transferring information from the segment controller to the segment banks in a logical sequence from unit 1 through unit *n*. When the banks are full, the system notes this and waits to erase the bank information and start with the next character group. Consequently, the first character may be directed by the second scanner to segment bank 1. The output of these banks is fed to its associated alpha-numeric display unit. The output of the banks may also control electric output wires to operate a printer or an electric typewriter or the like.

If, for instance, the character read by the reader is an A, the data representative of an A is stored in the temporary memory. Then, the A data is sent to the code comparator, the film memory then supplies data indicative of all the numeric and alphabetic characters and when it supplies data indicative of an A, a comparison is noted. This recognition signal from the code comparator is sent to the segment controller and the segment controller reads out of the film memory the display data for this A and sends it to segment bank 1. This, of course, is controlled by the segment scanner. Then this display data goes to the display units to display the A. If the next character is a B, the same thing takes place, but the display data is sent to segment bank 2. In the particular illustration in this figure, the display is that of the word STOP in segment banks 1, 2, 3 and 4, and 24X in the last three of the segment banks.

It should be reiterated that associated with each character in the film memory is two types of information. The first type is that characterized by the type of information to be supplied by the reader and which is to be compared in the code comparator. The second type associated with the character is the display data information which is going to be used ultimatly to actuate the alpha-numeric displays.

What has been described is one embodiment of the present invention. Other embodiments obvious from the teachings herein to those skilled in the art are contemplated to be within the spirit and scope of the following claims.

What is claimed is:

1. A system for deriving signals significant of a character projected as an image onto a plurality of photosensitive devices arranged in columns and rows to form a matrix of devices, said devices being in the first state when intercepting said image and in the second stage when not intercepting said image, said system comprising means to sequentially determine the states of individual devices in successive columns of said devices, means to store an indication of the first of said devices in each of said rows which exhibits said first state, means to compare the relative positions of said first devices in adjacent rows thereof and means to derive said significant signals as a result of said comparison.

2. A system as defined in claim 1 further including means to store an indication of the second of said devices in each of said rows which exhibits said first state, second means to compare the relative positions of said second devices in adjacent rows and second means to derive further significant signals as a result of said second means comparison.

3. A system as defined in claim 1 further including means to store an individual indication of the total number of first state devices in each of said rows and means to derive still further significant signals from said individual indications.

4. A system as defined by claim 3 further including means to receive said significant signals and means determined thereby to provide an indication of said character.

5. A system for deriving signals significant of a character projected as an image onto a plurality of photosensitive devices arranged in columns and rows to form a matrix of devices, said devices being in a first state when intercepting said image and in a second state when not intercepting said image, said system comprising a gate associated with each of said devices, means for conditioning said gate when its associated device is in said first state and for deconditioning said gate when its associated device is in said second state, means sequentially sampling the condition of each of said gates in a column-by-column fashion to thereby determine the state of said devices, means to store an indication of the first of said devices in each of said rows which exhibits said first state, means to compare the relative positions of said first devices in adjacent rows thereof and means to derive said significant signals as a result of said comparison.

6. A system as defined by claim 5 wherein said sequential sampling means includes a pulse distributor for directing pulses to said gates in parallel to each gate in a column and serially by columns.

7. A system as defined by claim 6 wherein said storage means includes a first counter associated with each of said rows of devices, means to advance the count of said counter each time a column of gates is sampled by said pulse distributor, means stopping the count of said counter upon the sampling of a first state device in said associated row.

8. A system as defined by claim 7 wherein said comparing means includes means to compare the counts in adjacent row counters to obtain a first set of equal, high or low comparison signals as a result of said comparison.

9. A system as defined by claim 8 further including means to store an individual indication of the total number of first state devices in each of said rows and means to derive still further significant signals from said individual indications.

10. A system as defined by claim 9 wherein said total number store comprises a second counter associated with each of said row of devices.

11. A system as defined by claim 10 further including means to store an indication of the second of said devices in each of said rows which exhibits said first state, second comparison means to compare the relative positions of said second devices in adjacent rows and means to derive further significant signals as a result of said second comparison means.

12. A system as defined by claim 11 wherein said second device storage means includes a third counter associated with each of said row of devices, means to advance the count of said third counter each time a column of gates is sampled by said pulse distributor after the sampling of a first state device in said associated row and means stopping the count of said third counter upon the sampling of a second first state device in said associated row.

13. A system as defined by claim 12 wherein said second comparison means includes means to compare the count in adjacent row third counters to obtain a second set of equal, high or low comparison signals as a result of said comparison.

14. A system as defined by claim 13 further including means to receive said two sets of equal, high or low comparison signals and said individual indications and means determined thereby to provide an indication of said character.

References Cited by the Examiner

UNITED STATES PATENTS 3,069,079 12/1962 Steinbuch -------- 340—146.3

MAYNARD R. WILBUR, *Primary Examiner.*

MALCOLM A. MORRISON, *Examiner.*

J. S. IANDIORIO, J. E. SMITH, *Assistant Examiners.*